(12) United States Patent
Kao et al.

(10) Patent No.: US 7,609,886 B2
(45) Date of Patent: Oct. 27, 2009

(54) METHOD AND APPARATUS FOR DYNAMIC IMAGE CONTRAST EXPANSION

(75) Inventors: Hsu-Pin Kao, Pingjhen (TW); Yi-Sheng Yu, Taoyuan (TW); Yi-Chia Shan, Jhongli (TW); Tsan-Hung Tsai, Sanchong (TW)

(73) Assignee: Marketech International Corp., Taipei (TW)

( * ) Notice: Subject to any disclaimer, the term of this patent is extended or adjusted under 35 U.S.C. 154(b) by 630 days.

(21) Appl. No.: 11/410,041

(22) Filed: Apr. 25, 2006

(65) Prior Publication Data

US 2007/0065008 A1 Mar. 22, 2007

(30) Foreign Application Priority Data

Sep. 21, 2005 (TW) ............................. 94132653 A

(51) Int. Cl.
*G06K 9/00* (2006.01)
(52) U.S. Cl. ....................................... 382/169; 382/168
(58) Field of Classification Search ................. 382/168, 382/169; 345/589, 590, 87, 690; 348/674, 348/676, 677, E5.073, E5.074
See application file for complete search history.

(56) References Cited

U.S. PATENT DOCUMENTS 6,664,973 B1 * 12/2003 Iwamoto et al. ............. 345/589

* cited by examiner

*Primary Examiner*—Anh Hong Do
(74) *Attorney, Agent, or Firm*—Bacon & Thomas, PLLC

(57) ABSTRACT

The present invention discloses a method and an apparatus for applying a dynamic contrast expansion technique to plasma display panels through performing a gamma conversion for the inputted image to convert the relationship of the brightness and gray level of the inputted image into a linear relation, performing a subtraction for the gray level value of the image to maintain the image at its smallest color deviation, analyzing the image property histogram to compute the maximum gray level and the minimum gray level required for carrying out the image contrast expansion and obtaining an image contrast expansion gain, and adopting an average of several previously inputted image contrast expansion gains and a current image contrast expansion gain as the contrast expansion gain used in the actual contrast expansion gain formula, so as to compute a new outputted gray level value after the image contrast expansion is performed.

32 Claims, 14 Drawing Sheets

METHOD AND APPARATUS FOR DYNAMIC IMAGE CONTRAST EXPANSION

FIELD OF THE INVENTION

The present invention relates to a method and an apparatus for dynamic image contrast expansion, and more particularly to a method and an apparatus for dynamic image expansion that can dynamically expand the image contrast to an optimal value according to the image gray level distribution range, so as to eliminate the flickering occurred during a dynamic change of screens and effectively reduce the noises produced at a low-gray level after the contrast of the image is expanded.

BACKGROUND OF THE INVENTION

In general, an image contrast expansion refers to expanding a gray level range to a maximum gray level range of 0~255, and its main objective is to increase the dynamic range of the gray level distribution. As to the visual effect, the image contrast is enhanced. For example, an 8-bit 256 gray-level image has a maximum gray level range of 0~255, but there is a loss of the image gray level distribution range in an actual video transmission due to the signal attenuation of photography, duplication and transmission. In a general 8-bit television video system, the actual number of gray levels of the video display is less than 256, and thus the video contrast will be attenuated, and the video quality will be deteriorated. In addition to the foregoing factors, the properties and parameters of the analog components in the video interface also cause a loss of the image gray level distribution range and adversely affect the displaying effect. For example, since most video decoders decode a received video signal according to its recommended parameters, the gray level range of the decoded image generally falls between 17~235. Further, the factory default settings of the brightness and contrast of the video interface, the computation of scalar, and the conversion of color matrix will also affect the image gray level distribution range directly.

Traditionally, the image contrast is enhanced to improve the image gray level distribution range, and the dynamic image contrast expansion adjustment technique is applied to process the images, and its method substantially includes the following steps:

1. Firstly, the properties of the image gray level distribution of the three colors: red (R), green (G), and blue (B) of a color image are analyzed. Referring to the image property histogram as shown in FIG. 1, the x-axis represents the gray levels of the image, and the y-axis represents the number of pixels, and the image property histogram is a statistical chart primarily illustrating the number of pixels in each gray level. Therefore, the image property histogram tells the gray level distribution conditions of an image, and thus the image property histogram is usually used for describing the characteristics of an image such as a dark image or a bright image. The area included in the curve of the whole image property histogram represents the total number of pixels of a whole image. Referring to FIG. 2 for the image of a bright screen, the image property histogram of FIG. 3 clearly shows that the main gray level of the image as shown in FIG. 2 is distributed in a high gray level range between 180~220 and shifted to the right side of the image property histogram. Referring to FIG. 4 for the image of a mid-brightness screen, the image property histogram of FIG. 5 clearly shows that the main gray level of the image as shown in FIG. 4 is distributed in a mid gray level range between 15~230 and resided in the middle section of the image property histogram. Referring to FIG. 6 for the image of a dark screen, the image property histogram of FIG. 7 clearly shows that the main gray level of the image as shown in FIG. 6 is distributed in a low gray level range between 15~40 and shifted to the left side of the image property histogram.

2. Secondly, the maximum gray level and minimum gray level required by computing an image contrast expansion are defined. In general, the maximum gray level is obtained by integrating the area from the utmost right side toward the left side of the image property histogram, and its corresponding gray level is defined as the maximum gray level when a critical value of the integrated area is achieved. The minimum gray level is obtained by integrating the area from the utmost left side towards the right side of the image property histogram, and its corresponding minimum gray level is defined if a critical value of the integrated area is achieved. Taking the image processing software, PhotoShop, for example, we define the 5% of the area on the right side of the image property histogram as the maximum gray level (max) and the 5% of the area on the left side of the image property histogram as the minimum gray level (min). Since a color image includes three colors: red, green, and blue, therefore the maximum gray level of the processed image adopts the maximum of the three colors: red, green, and blue and the minimum gray level adopts the minimum of the three color red, green, and blue.

3. The formula for the image contrast expansion is given as follows. After the required maximum gray level (max) and the minimum gray level (min) are obtained, the maximum gray level and the minimum gray level are used to compute a new gray level value Gray' and an image contrast expansion gain (which has a value k in Formula (2)) of the processed image contrast expansion:

$$\text{Gray}' = k \times (\text{Gray} - \text{min}) \quad (1)$$

$$k = \frac{255}{\text{max} - \text{min}} \quad (2)$$

Since a plasma display panel (PDP) usually comes with a large screen and its structural properties are totally different from those of traditional color cathode ray tubes (CRT), therefore the dynamic contrast expansion technique used for the traditional small-size CRT televisions cannot be used directly for the plasma display panels. It is necessary to make an appropriate modification of the algorithm of the dynamic contrast expansion technique according to the properties of the plasma display panels. The most difficult point is to avoid the flickering of a large plasma display panel, the too-low signal noise ratio (SNR) of a signal at a low gray level, and the noise produced by the contrast expansion, when a dynamic contrast adjustment is made.

The problem of producing noises easily after a contrast expansion is processed for a too-low SNR at a low gray level is described as follows. Referring to FIG. 8 for the measured results after a low gray level white image of a low gray level 4 is produced by a graphic generator, a YPbPr path of a video interface is inputted, and a video decoder is used for decoding, it is obvious that the outputted gray level range of the red and blue colors is 4±3 and the gray level range of the green color is approximately 8±3. Since the gray level distribution ranges of the three colors are plus and minus 3, the SNR of the red and blue colors is defined as 4/3, and the SNR of the green is defined as 8/3. Referring to FIG. 9 for the measured result after a mid gray level white image of a gray level 128 is produced by a graphic generator, a YPbPr path of a video interface is inputted, and a video decoder is used for decoding, it is obvious that the gray level output range of the red color is 121±3, the gray level output range of the green color is approximately 124±2, and the gray level output range of the blue color is 120±3. Now, the SNR of the red color is defined as 121/3, the SNR of the green color is defined as 124/2, and the SNR of the blue color is defined as 120/3. From the description above, the SNR of the image at a low gray level is lower. If it is necessary to amplify the video signal by the digital method, then an obvious noise will be produced at the original position of a low gray level due to the lower SNR. In summation of the description above, it is an important topic for video display manufacturers to apply the dynamic contrast expansion technique to the plasma display panels to improve the image gray level distribution range and video contrast, and effectively avoid the flickering produced in a plasma display panel and the noise due to a low SNR produced after the image at a low gray level is enhanced.

SUMMARY OF THE INVENTION

In view of the foregoing shortcomings of the prior art, the inventor of the present invention based on years of experience to conduct extensive researches and experiments to improve the prior art, and finally invented a novel dynamic image contrast expansion technique for dynamically expanding the image contrast to an optimal value according to the image gray level distribution range, so as to eliminate the flickering occurred during a dynamic change of screens and effectively reduce the noises produced at a low-gray level after the contrast of the image is expanded.

Therefore, it is a primary objective of the present invention to provide a method and an apparatus for dynamic image contrast expansion, and the method comprises the following steps. Firefly, a gamma conversion for the inputted image is performed to convert the relationship of the brightness and gray level of the inputted image into a linear relation. After the image contrast expansion technique performs a subtraction for the gray level value of the image, the image can maintain its smallest color deviation. Secondly, the image property histogram is analyzed to compute the maximum gray level and the minimum gray level required for carrying out the image contrast expansion, and then the maximum gray level and the minimum gray level are used to obtain an image contrast expansion gain, so as to prevent the influence caused by the property of the image in a very small area or the noises, and lower the image contrast expansion effect. Finally, an average of several previously inputted image contrast expansion gains and a current image contrast expansion gain is adopted as the contrast expansion gain for the formula of computing the dynamic contrast expansion and used in the actual contrast expansion gain formula, so as to compute a new outputted gray level value after the image contrast expansion is performed.

Another objective of the present invention is to avoid the flickering occurred in the image by adopting a minimum gray level for the formula of computing the dynamic contrast expansion, and an average of several previous minimum gray levels and a current minimum gray level of the image is used as the minimum gray level for the actual computation to compute a new outputted gray level value after the image contrast expansion is performed.

A further objective of the invention is to use a preset gain conversion table to look up the image contrast expansion gain according to the maximum gray level and the minimum gray level so as to omit the division required in the formula for the actual computation of the dynamic contrast expansion, and effectively improve the processing speed and efficiency of the image contrast expansion and achieve the image contrast expansion effect quickly.

Another objective of the present invention is to design a gamma conversion table that varies according to different contrast expansion gains for reducing the noises at the low gray level and carrying out a gamma value adjustment for the outputted images at low gray levels. Such arrangement not only maintains the contrast enhancement effect, but also achieves the effect of reducing noises at low gray levels.

Another further objective of the present invention is to convert the relation of the brightness and gray level of the outputted image such that the product of the gamma value of the outputted image and the gamma value of a video display is maintained at 1.0 according to the optoelectronic properties of the video display and the gamma value of the video display module corresponding to the brightness and gray level when a gamma conversion is performed for the outputted image.

The above and other objects, features and advantages of the present invention will become apparent from the following detailed description taken with the accompanying drawings.

DETAILED DESCRIPTION OF THE PREFERRED EMBODIMENTS

Figure 1:
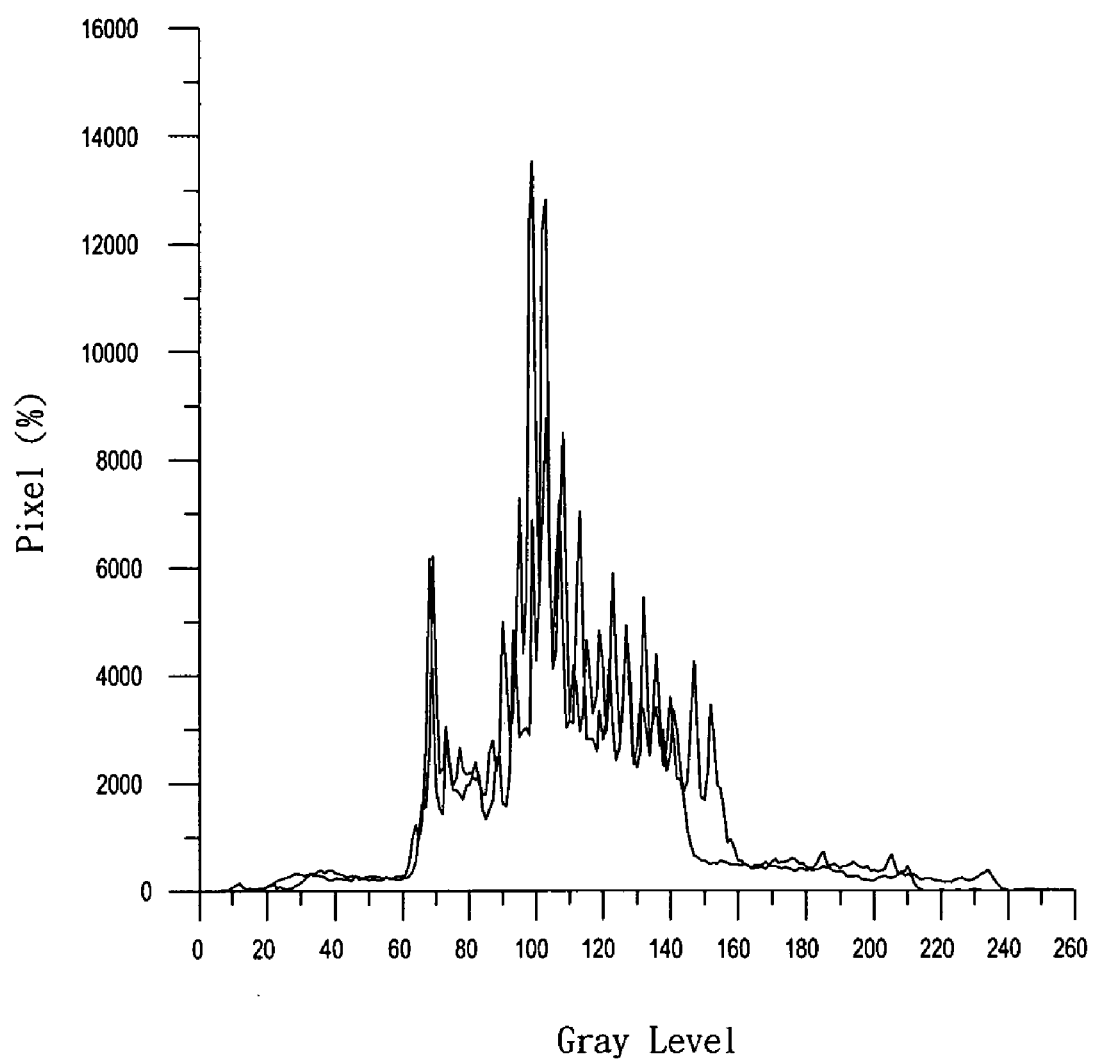
FIG. 1 is an image property histogram of a prior art.
Figure 2:
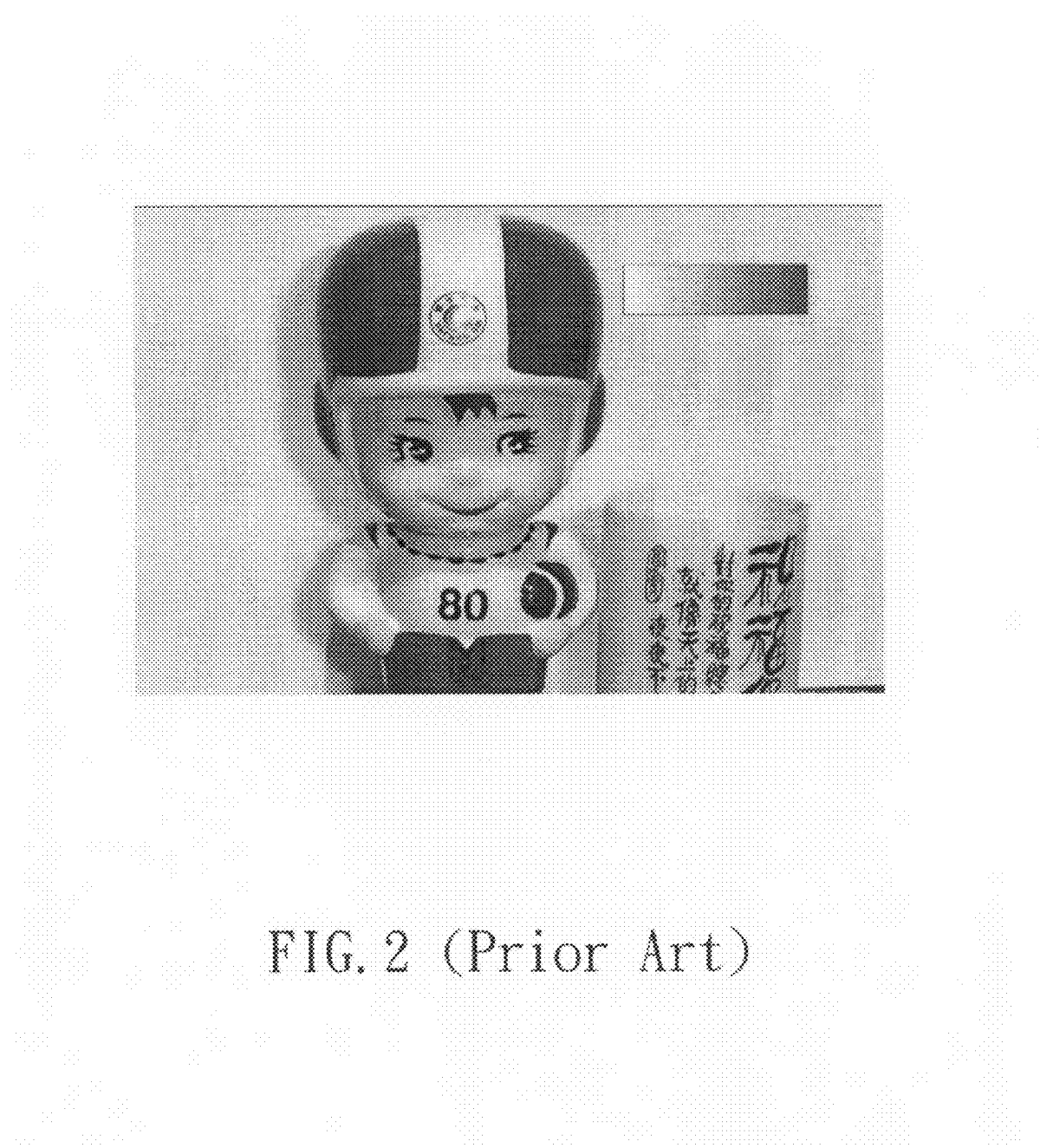
FIG. 2 is an image of a bright screen.
Figure 3:
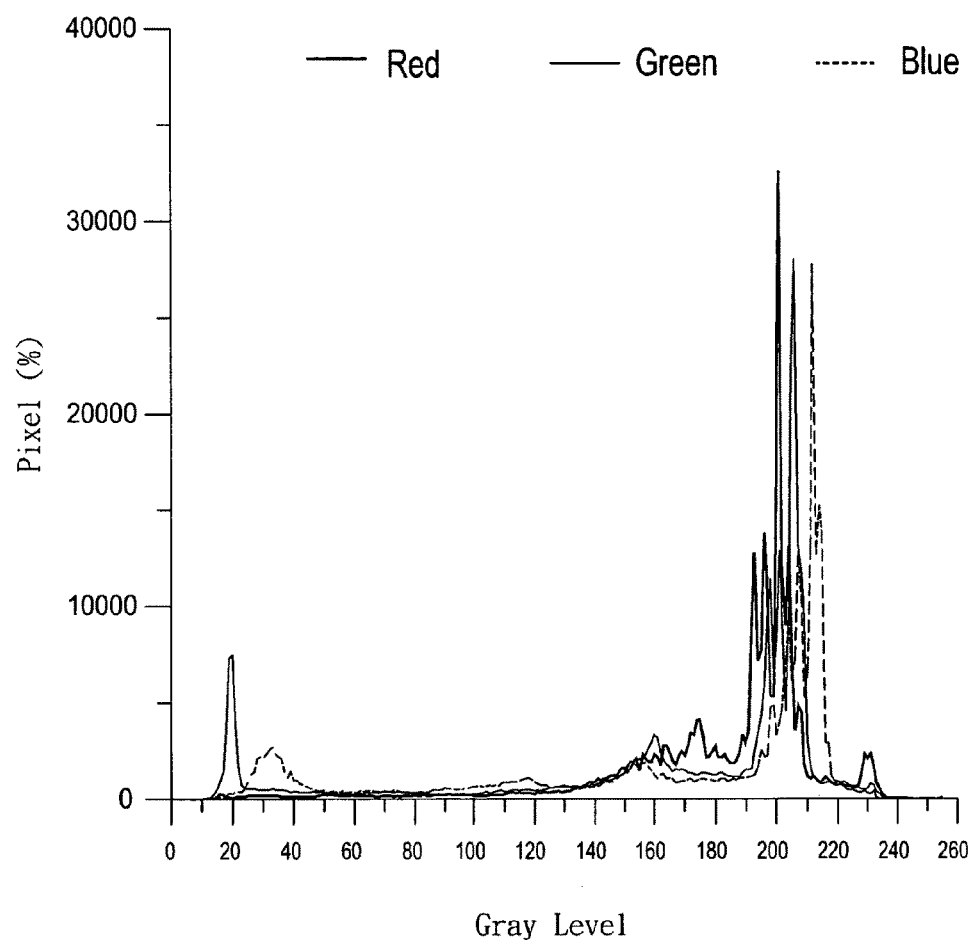
FIG. 3 is an image property histogram of the image shown in FIG. 2.
Figure 4:
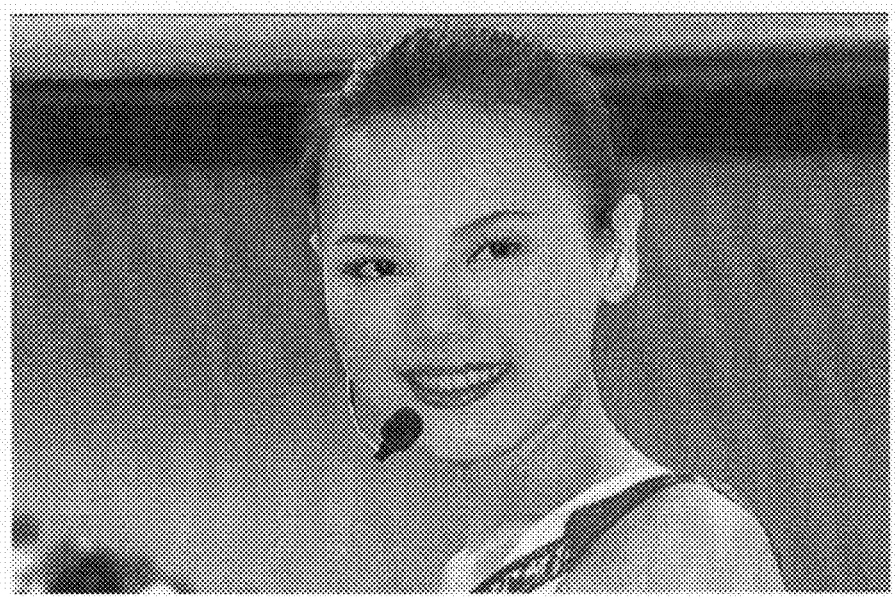
FIG. 4 is an image of a mid-brightness screen.
Figure 5:
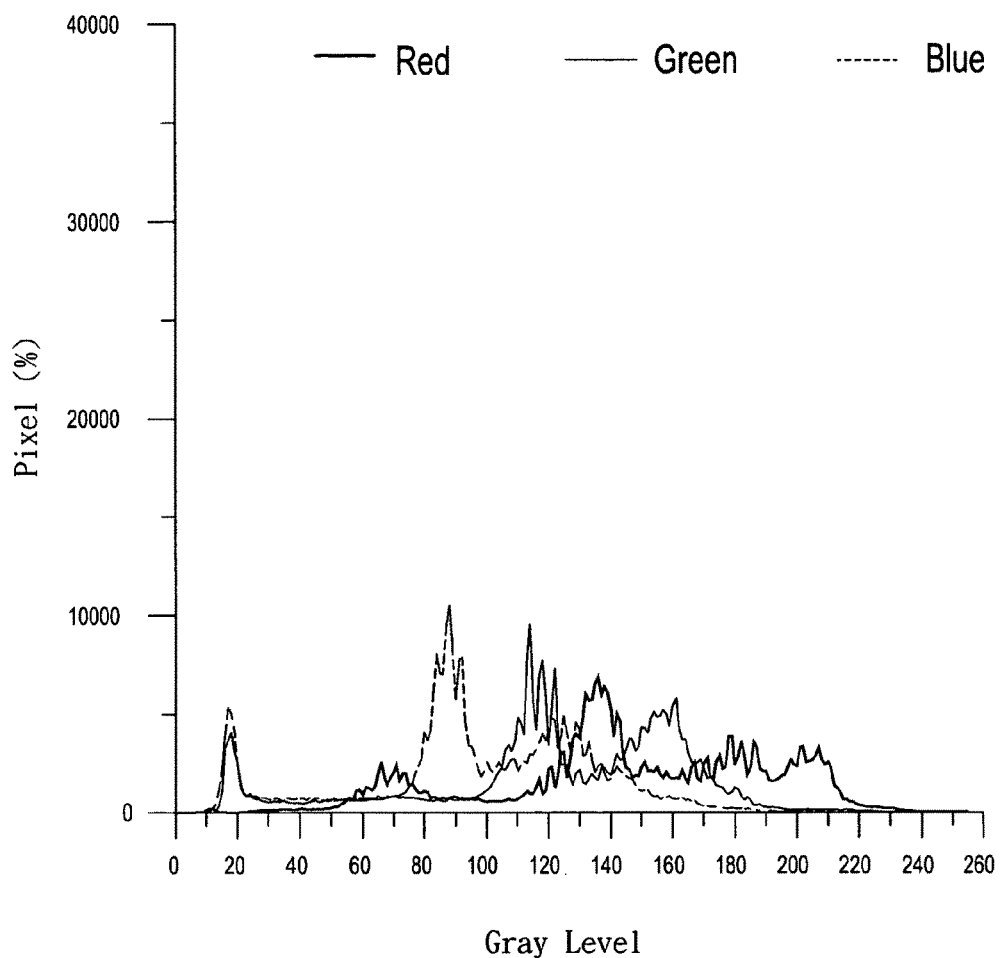
FIG. 5 is an image property histogram of the image as shown in FIG. 4.
Figure 6:
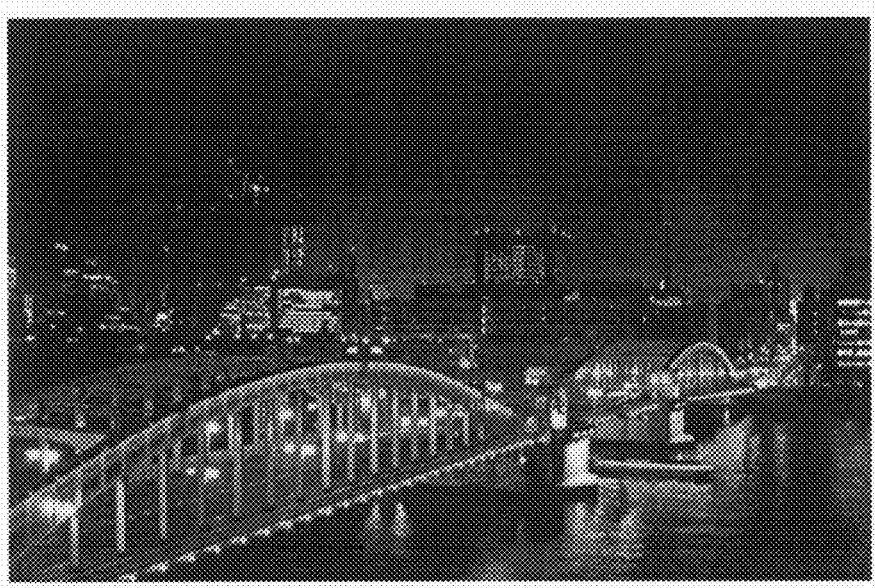
FIG. 6 is an image of a dark screen.
Figure 7:
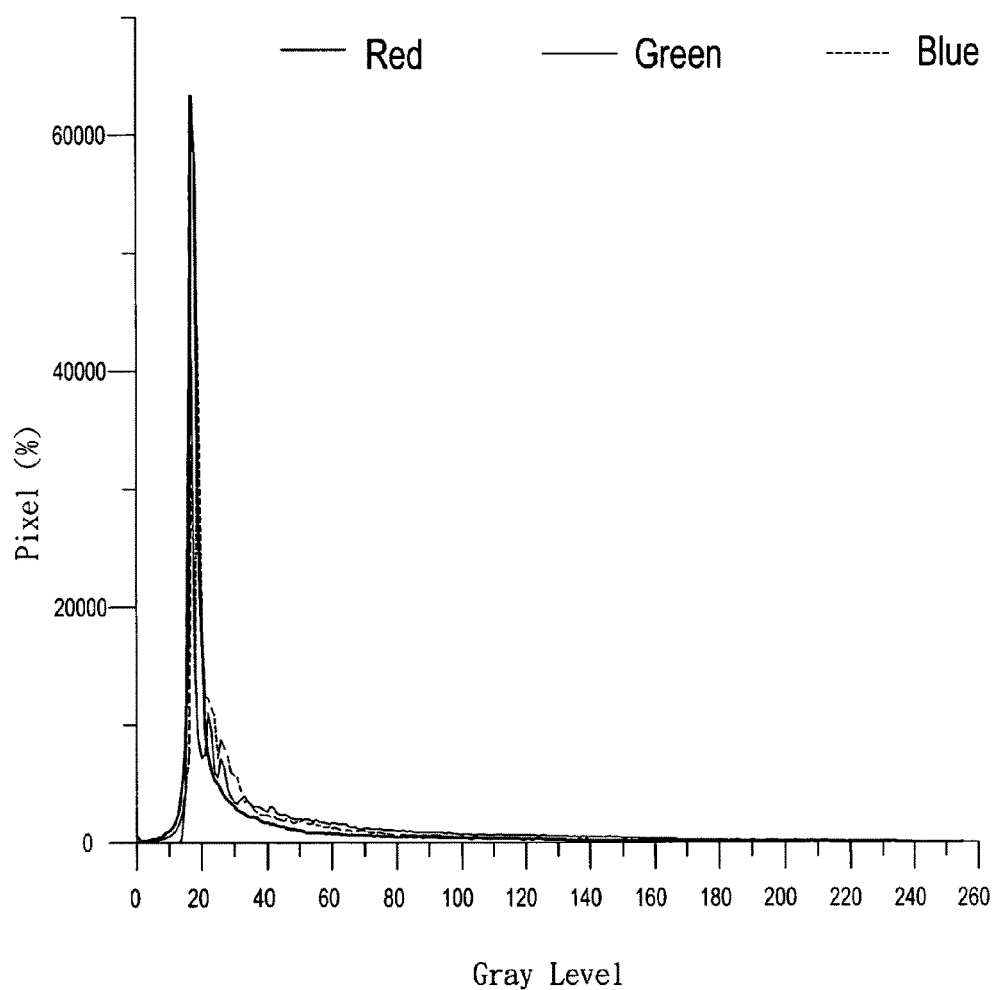
FIG. 7 is an image property histogram of the image as shown in FIG. 6.
Figure 8:
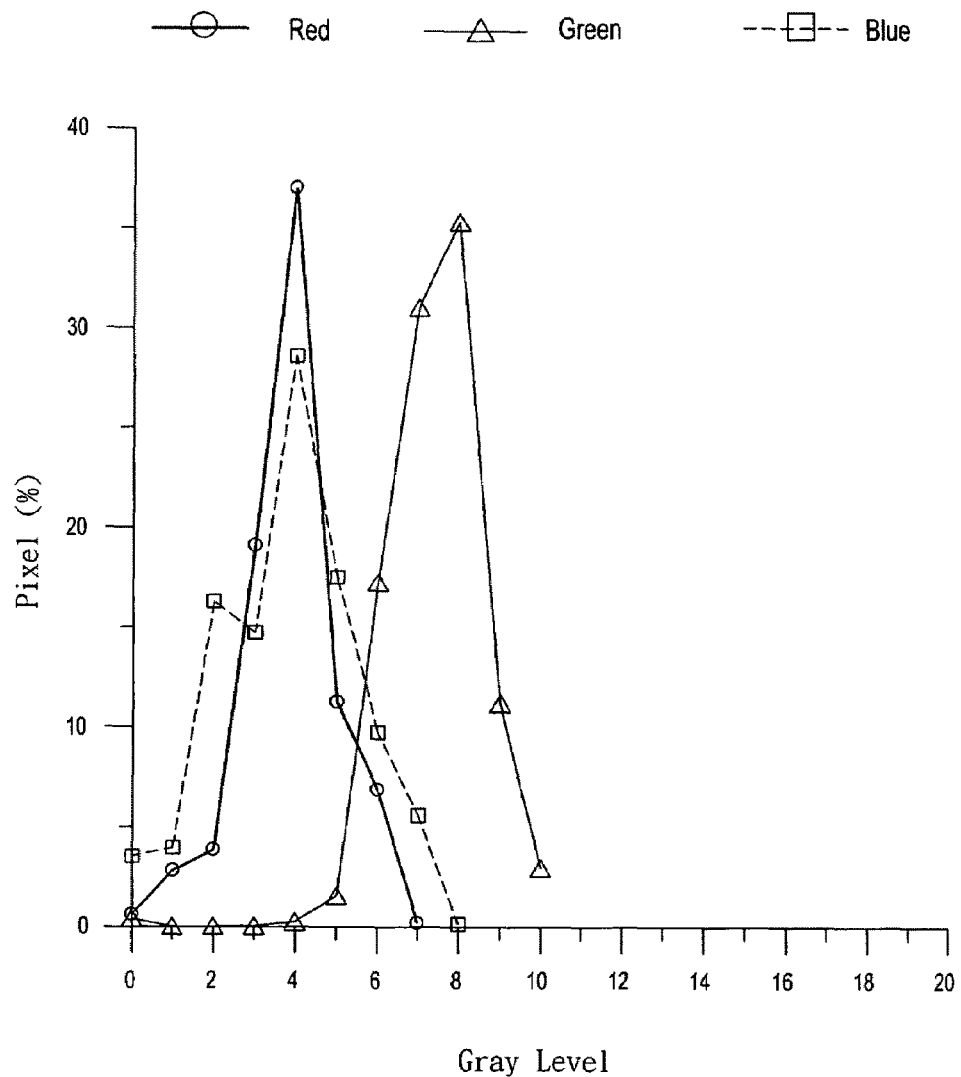
FIG. 8 shows an outputted gray level distribution after a low gray level image is processed by a video interface.
Figure 9:
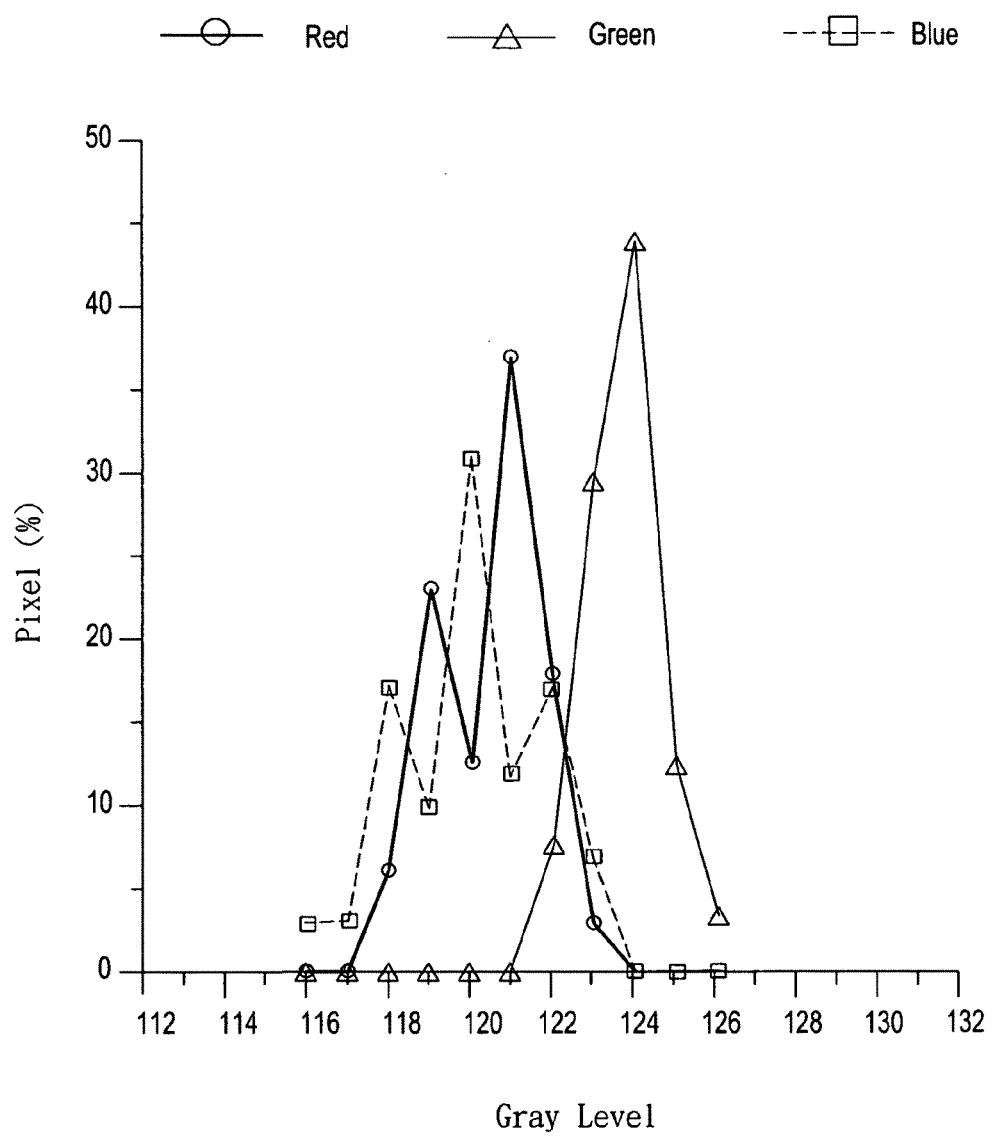
FIG. 9 shows an outputted gray level distribution after a mid gray level image is processed by a video interface.

In a method and an apparatus for dynamic image contrast expansion, the method is applied to a video display for processing an inputted image according to an inputted image gray level distribution range, so that the image contrast is dynamically expanded to an optimal condition to effectively eliminate the flickering occurred during the dynamic changes of video screens and reduce the noises of the images at low gray levels after the contrast expansion is carried out. The method comprises the following steps:

(1) Firefly, a gamma conversion for the inputted image is performed to convert the relationship of the brightness and the gray level of the inputted image into a linear relation. After the image contrast expansion technique performs a subtraction for the gray level value of the image, the image can maintain its smallest color deviation.

(2) Secondly, the image property histogram is analyzed to compute the maximum gray level and the minimum gray level required for carrying out the image contrast expansion, and then the maximum gray level and the minimum gray level are used to obtain an image contrast expansion gain, so as to prevent the influence caused by the properties of the image in a very small area or the noises, and lower the image contrast expansion effect.

(3) Finally, an average of several previously inputted image contrast expansion gains and a current image contrast expansion gain is adopted as the contrast expansion gain for the formula of computing the dynamic contrast expansion and used in the formula for the actual computation of the contrast expansion gain, so as to compute a new outputted gray level value after the image contrast expansion is performed.

Further, the present invention can effectively improve the processing speed and the efficiency of the image contrast expansion and quickly achieve the image contrast expansion effect. In the computation of the contrast expansion gain, a gain table is designed in advance, and the contrast expansion gain is obtained by looking up the table according to the maximum gray level and the minimum gray level. Such arrangements omits the division required for the computation of the dynamic contrast expansion and greatly reduces the hardware resources consumed for the division operation, and thus greatly reducing the costs and expenditures.

Further, the present invention can reduce the noises of an image at a low gray level by adopting a gamma conversion table that varies according to different contrast expansion gains and carries out a gamma adjustment for the outputted images at low gray levels. Such arrangement not only maintains the contrast enhancement effect, but also achieves the effect of reducing noises at low gray levels. Finally, a gamma conversion is performed for the outputted image, such that the product of the gamma value of the outputted image and the gamma value of a video display is maintained at 1.0 according to the optoelectronic properties of the video display and the gamma value of the video display module corresponding to the brightness and gray level, before the image is outputted to the video display.

Figure 10:
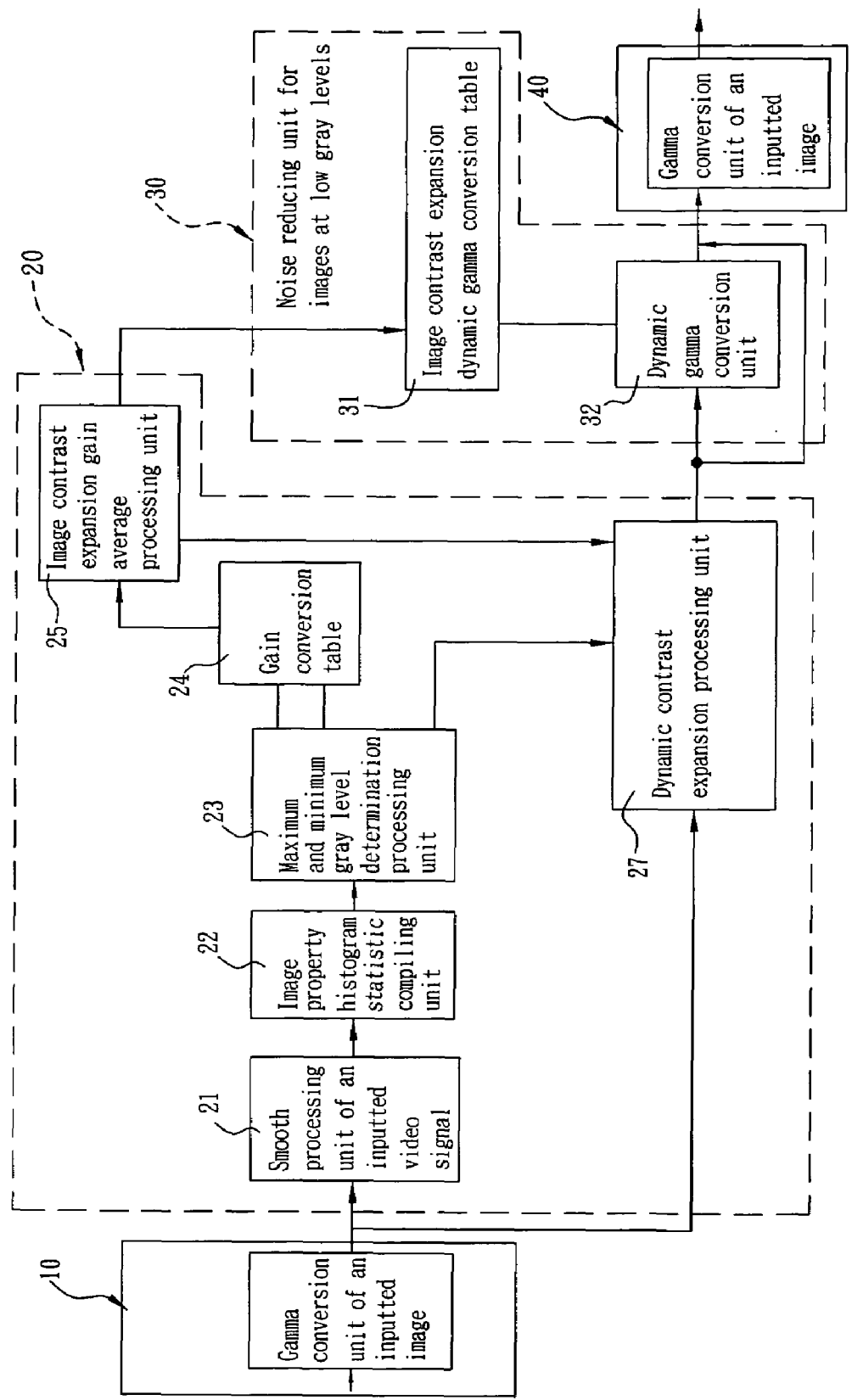
FIG. 10 is a schematic view of a structure according to a first preferred embodiment of the present invention.

To fully demonstrate the design concept and functions of the present invention, a preferred embodiment as shown in FIG. 10 is used for the illustration. The preferred embodiment describes an apparatus applied on a video display for the dynamic image contrast expansion that incorporates the method of the present invention, and the apparatus comprises four units: the first unit is a gamma conversion unit 10 for inputted images; the second unit is an image dynamic contrast expansion unit 20; the third unit is a noise reducing unit 30 for images at low gray levels; and the fourth unit is a gamma conversion unit 40 for outputted images.

In this preferred embodiment, the gamma conversion unit 10 for inputted unit is provided for carrying out a gamma conversion for inputted images. Since the relation between the gray level and the brightness of a traditional image inputted to a video display has gone through a conversion of gamma=0.45, therefore a linear relation exists between the gray level and the brightness. It is necessary to carry out a conversion of gamma=2.2 for the gray level value of the image inputted to the video display. Since the preferred embodiment carries out the computation according to the following image contrast expansion formula (1), $$\text{Gray'}=k\times(\text{Gray}-\text{min}) \quad (1)$$

A subtraction is performed for the gray level value Gray of the inputted image, so that a linear relation exists between the gray level value and the brightness of the inputted image. After the subtraction is preformed, the inputted image Gray' can maintain its minimum color deviation. When the conversion of gamma=2.2 is performed for the gray level value of the inputted image, it is necessary to amplify the video signal to obtain more details of the gray level, such as the original 8-bit inputted image has to be enlarged to an image of over 10 bits when performing the gamma conversion to enhance the details of the image at the low gray level.

The image dynamic contrast expansion unit 20 determines the maximum gray level (max) and the minimum gray level (min) required for computing the image contrast expansion by analyzing the image property histogram, and then the following formula (2) is used to determine the image contrast expansion coefficient k (which is the gain):

$$k = \frac{255}{\max - \min} \quad (2)$$

Therefore, the influence due to the properties of a very small area or a small noise can be avoided to lower the image contrast expansion effect. The image dynamic contrast expansion unit 20 comprises the following units.

(a) A smooth processing unit 21 for smoothing an inputted video signal: When a pre-processing such as a sharpness filter is performed on an 8-bit image, the boundaries of many images are expanded to the gray level 0 or the gray level 255, and thus it will affect the determination of the maximum gray level and the minimum gray level for carrying out the image contrast expansion, and thus the effect of contrast expansion will be poor. To solve this problem, this preferred embodiment performs the smooth process to the video signal used for compiling statistics of the image property histogram only, but it will not perform the smooth process on the outputted video signal, and thus will not affect the resolution of the image, and the smooth process of the video signal can use the following smooth mask for the process:

$$\frac{1}{4}\begin{array}{|c|c|c|}\hline 1 & 2 & 1 \\ \hline\end{array}$$

(b) A statistic compiling unit 22 for the image property histogram: it is used for compiling the statistics of the pixels for each gray level value of all pixels of the image. For example, a color image of 1366*768 pixels has a total number over 3 million points for the statistics, and thus creating a tremendous burden to the computational circuit. In this preferred embodiment, a sample is taken for each pixel between every interval of M rows and every interval of N points, such as a sample being taken for every interval of 4 rows and every interval of four points. Therefore, it only needs to take 1/16 of the total data for the statistics while maintaining the video characteristics.

(c) A maximum and minimum gray level determination processing unit 23: The maximum gray level can be obtained by integrating the area from the utmost right side of the image property histogram towards the right side, and if the integrated area reaches a critical value $Th_{max}$, then the corresponding gray level value is defined as the maximum gray level. The minimum gray level can be obtained by integrating the area from the utmost left side of the image property histogram towards the right side, and if the integrated area reaches a critical value $Th_{min}$, then the corresponding gray level value is defined as the minimum gray level (min).

(d) A gain conversion table 24: The image contrast expansion adopts formula (1) to calculate the gray level value of the outputted image. To effectively improve the processing speed and efficiency of the image contrast expansion, the image contrast expansion coefficients k are computed from various different maximum gray levels (max) and minimum gray levels (min) according to Formula (2) to produce the following gain conversion table 24:

| max-min | K |
|---|---|
| 0 | 1 |
| 1 | 255 |
| 2 | 128 |
| 3 | 85 |
| ... | ... |
| 255 | 1 |

After the maximum gray level and the minimum gray level required for performing the contrast expansion of the inputted image are computed, the gain conversion table 24 can be looked up to obtain the image contrast expansion coefficient k, and thus the division as shown in Formula (2) can be omitted to achieve the image contrast expansion effect quickly.

(e) An image contrast expansion gain average processing unit 25: To avoid the flickering produced by the image when performing a dynamic image contrast expansion, the $N-1^{th}$ image is taken and adopted as a contrast expansion gain in Formula (1) for this preferred embodiment, and the maximum gray level and the minimum gray level of the image are used to look up the gain conversion table 24 to obtain the corresponding contrast expansion gain $k_1 \sim k_{N-1}$, and then an average is computed from the corresponding image contrast expansion gains $k_N$ according to Formula (3). The average $k_{out}$ is used as the contrast expansion gain in Formula (1):

$$k_{out} = \frac{1}{N}\sum_{i=1}^{N} k_i \quad (3)$$

Figure 11:
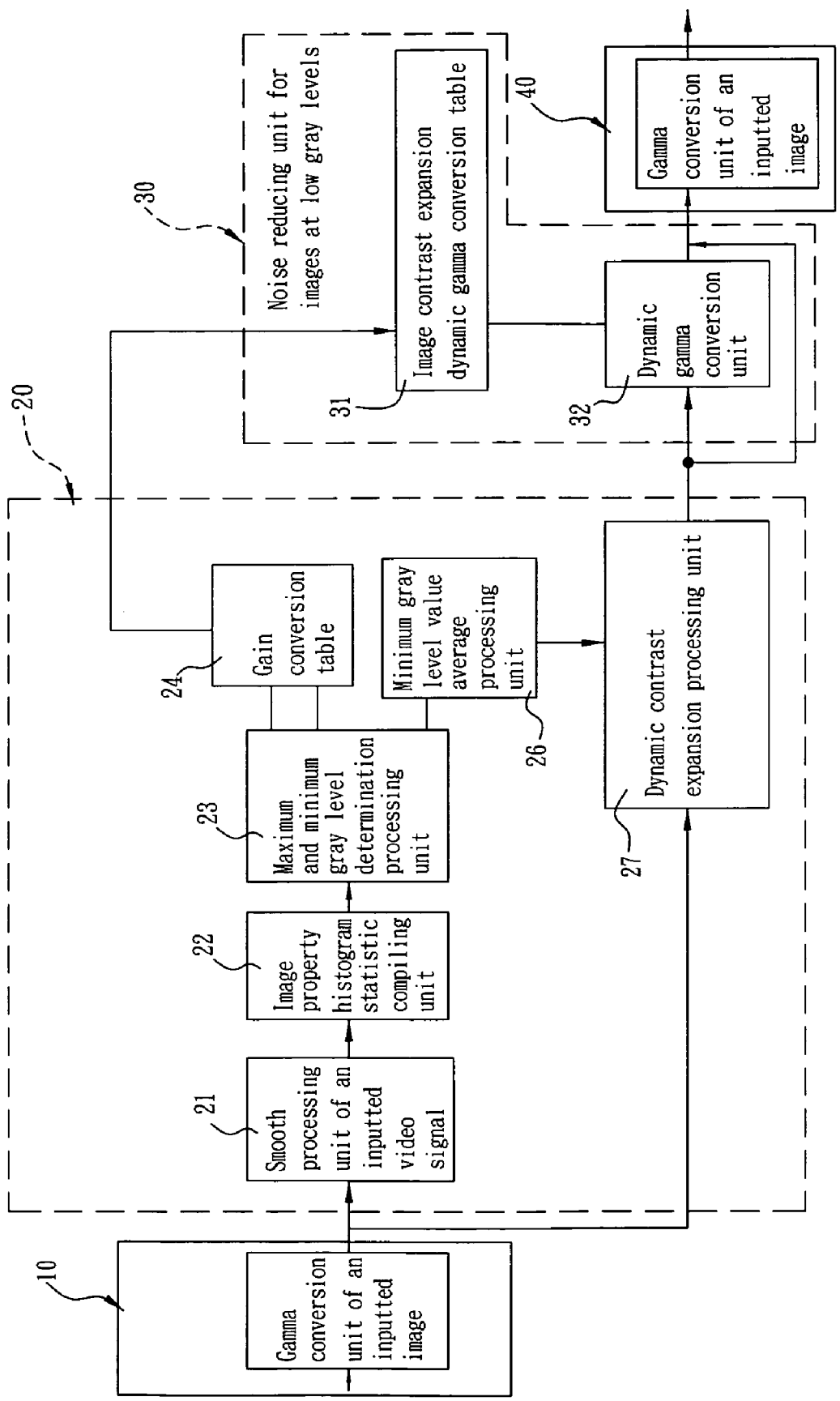
FIG. 11 is a schematic view of a structure according to a second preferred embodiment of the present invention.

For example, an average computed from the contrast expansion gains of the first $31^{st}$ image outputs and the contrast expansion gain of the current image is used as the contrast expansion gain of the $32^{nd}$ image output. Referring to FIG. 11 for preventing the flickering of an image according to another preferred embodiment of the invention, the image dynamic contrast expansion unit 20 similarly comprises a minimum gray level average processing unit 26, and when the unit 26 carries out the operation of the $N^{th}$ image, an average of the minimum gray level $min_1 \sim min_{N-1}$ of the previous $N-1^{th}$ images and the minimum gray level $min_N$ corresponding to the current image is calculated, and such average is used as the minimum gray level $min_{out}$ in Formula (4):

$$min_{out} = \frac{1}{N}\sum_{i=1}^{N} min_i \quad (4)$$

Figure 12:
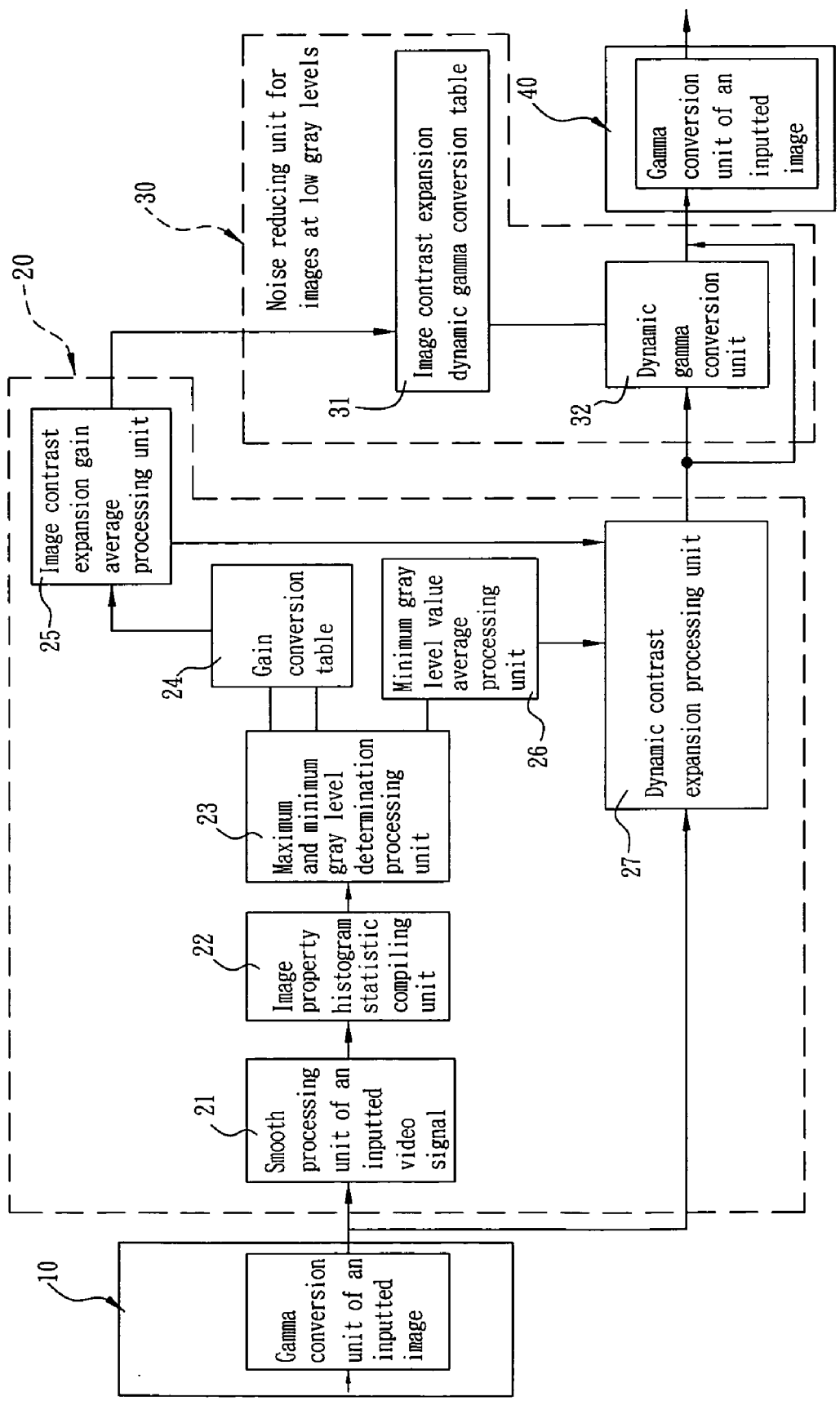
FIG. 12 is a schematic view of a structure according to a third preferred embodiment of the present invention.

It is worthy to point out that either one or both of the foregoing average processing units 25, 26 can be installed according to actual needs. Referring to FIG. 12 for another preferred embodiment of the present invention, the flickering problem can be solved effectively. However, each processing unit 25, 26 will produce an increasingly bright or dark screen if the change of brightness between two consecutive images is very large. To overcome this shortcoming, the preferred embodiment of the present invention further includes a critical value $k_{TH}$ of the image contrast gain, such that if the difference of the image contrast gain $k_N$ of the looked up image of the current image and the image contrast gain $k_{N-1}$ of the previous image is larger than the critical value $k_{TH}$, then the present invention will set the image contrast gain of the current image to $k_N$ and will not perform the computation of the average for the gains. In the meantime, the image contrast gain of the previous N–1 images will be set to $k_N$ to effectively improve the phenomenon of the increasingly bright or dark screen.

(f) A dynamic contrast expansion processing unit 27: After the computations of the contrast expansion gain $k_{out}$ and the minimum gray level $mino_{out}$ are completed, the gray level value Gray, the contrast expansion gain $k_{out}$ and the minimum gray level $min_{out}$ of the video signal are inputted into the dynamic contrast expansion processing unit 27 and computed according to Formula (1) to obtain the gray level value Gray' of the image outputted after the image dynamic contrast expansion is processed, so as to achieve the image contrast expansion effect quickly.

Figure 13:
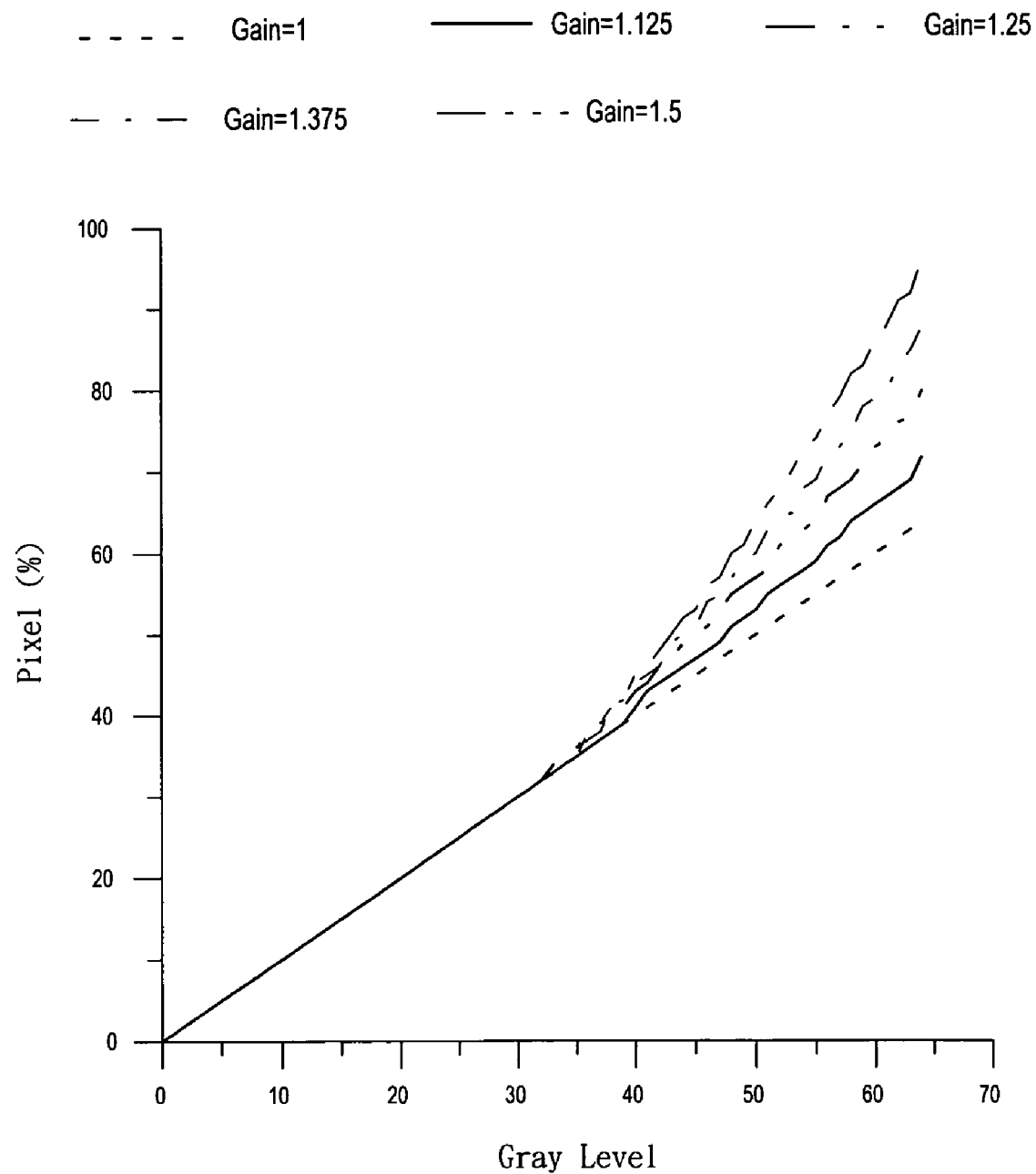
FIG. 13 shows a gamma graph corresponding to different image contrast expansion gains.
Figure 14:
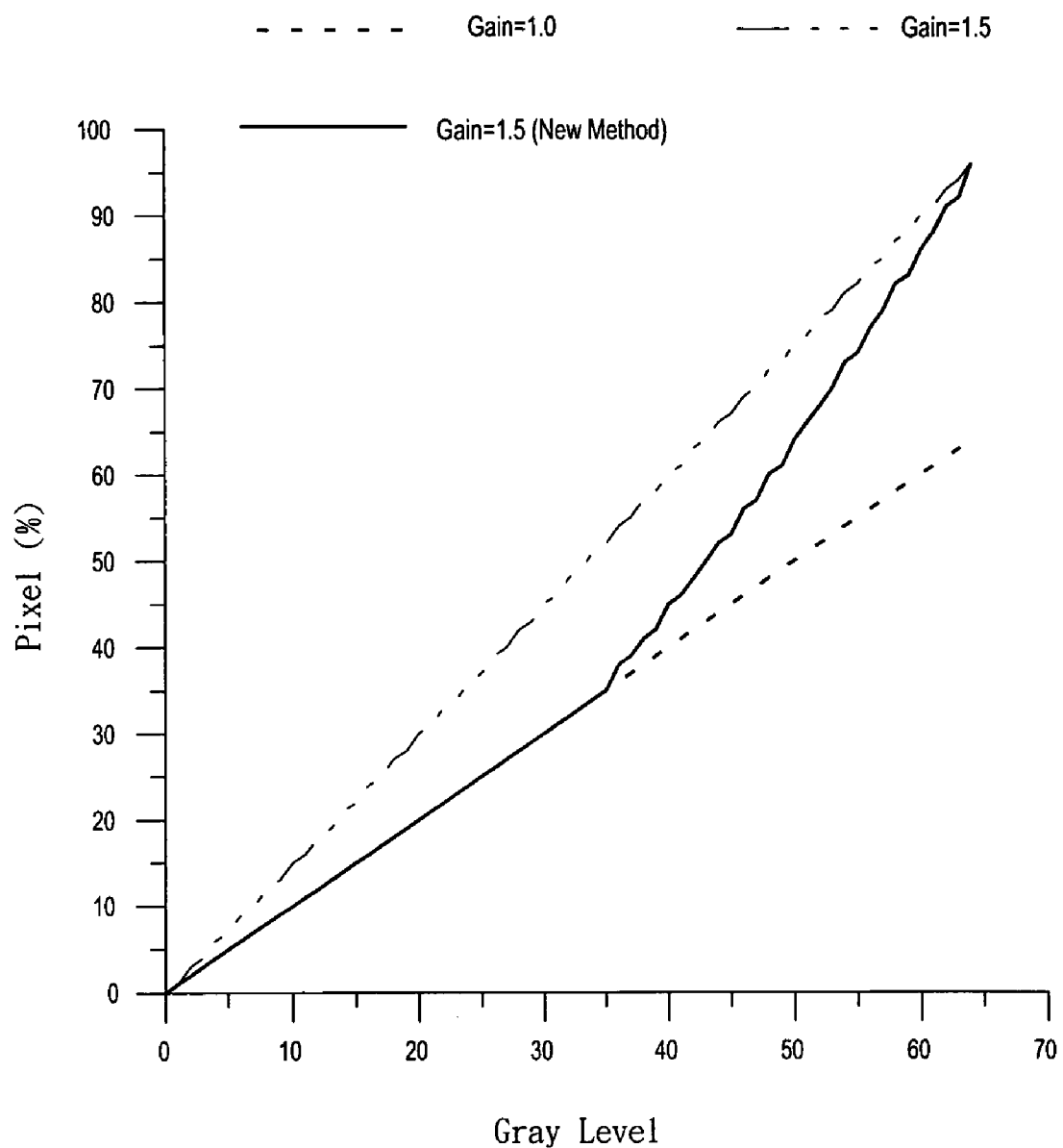
FIG. 14 shows a comparison of the input and output gray levels at a low and mid gray level position of an image between the image contrast expansion technologies used by the present invention and a prior art.

In general, the video signal inputted into a video display is usually an analog signal such as $YP_bP_r$, S-Video and Composite signals. Since the analog signals will be interfered easily and have a too-low signal noise ratio (SNR) at a low gray level, therefore if the foregoing digital method is used for performing an image contrast expansion for an image and the contrast expansion gain is too large, then a distributing noise will be produced easily for the image at a low gray level. To overcome this shortcoming, a preferred embodiment of the present invention specially adds a noise reducing unit 30 at a low gray level, and the reducing unit 30 comprises a dynamic gamma conversion table 31 for the image contrast expansion and a dynamic gamma conversion unit 32. The gamma in the conversion table 31 varies according to different contrast expansion gains. The corresponding gamma graph for different image contrast expansion gains is shown in FIG. 13. The dynamic gamma conversion unit 32 can perform a gamma value adjustment for an image at a low and mid gray level according to the conversion table 31. Therefore, there is a difference between the image contrast expansion technique of the present invention and the tradition contrast expansion technique. Referring to FIG. 14 for the comparison of the inputted and outputted gray levels at the low and mid gray levels of the image, the inputted gray level can be treated as a gray level (Gain=1.0) without an image contrast adjustment, and the gray level value of a primitive image observed by eyes and gone through the contrast expansion adjustment is treated as the outputted gray level. Therefore, FIG. 12 clearly shows that after the noise reducing unit 30 has processed the outputting image at a low gray level, the range of the inputted gray level of the image below 32 is defined as a low gray level range, and the processing result is the same as that has not gone through the image contrast expansion. In other words, the image at a gray level range will not improve the brightness due to the image contrast expansion or cause any noise. After an image is processed by the dynamic contrast expansion technique of the present invention, the range of the image at an inputted gray level of over 64 comes up with a result almost identical to the traditional image contrast expansion processing (Gain=1.5). That is, the dynamic contrast expansion technique has almost the same effect as the transitional contrast expansion effect for the images at a high gray level range. Such arrangement not only maintains the image contrast enhancement effect, but also achieves the effect of reducing noises at low gray levels.

In this preferred embodiment, if the outputted image is outputted to the screen of the video display, it is necessary to perform a gamma conversion to the outputted image through the gamma conversion unit 40 of the outputted image. Since the optoelectronic properties of different video displays are not the same, therefore if the graph of the brightness and the gray level of a video display is gamma=2.2, then it is necessary to perform a conversion of gamma=0.45 to the outputted image to maintain the product of the gamma value of the brightness and gray level of the video display and the gamma value of the outputted image at 1.0.

In summation of the description above, an inputted image goes through the processing by the foregoing units to achieve the dynamic image contrast expansion as well as overcoming the noise issue of an image at a low gray level after the image at a low dynamic gray level range has gone through the image contrast expansion.

While the invention herein disclosed has been described by means of specific embodiments, numerous modifications and variations could be made thereto by those skilled in the art without departing from the scope and spirit of the invention set forth in the claims.

What is claimed is:

1. A method for dynamic image contrast expansion used for processing an inputted image, comprising the steps of:
    using an inputted image gamma conversion unit for performing a gamma conversion to said inputted image to convert a relation of brightness and gray level of said inputted image into a linear relation;
    using an image dynamic contrast expansion unit for analyzing an image property histogram of said inputted image, and calculating a maximum gray level and a minimum gray level required for computing an image contrast expansion, and using said maximum gray level (max) and said minimum gray level (min) and the following formula:

$$k = \frac{255}{max - min}$$

to obtain an image contrast expansion gain (k);
    performing a dynamic contrast expansion according to the following formula:

Gray'=$k$×(Gray−min), wherein said contrast expansion gain is an average of a plurality of previously inputted image contrast expansion gains and a current image contrast expansion gain used as a gain for a dynamic contrast expansion formula to compute a new gray level value Gray' according to the gray level value Gray of said inputted image, after said image contrast expansion is performed.

2. The method of claim 1, wherein said different maximum gray levels and minimum gray levels are used to compute corresponding image contrast expansion gains k according to a formula in advance to produce a gain conversion table, such that when said contrast expansion gain, said maximum gray level, and minimum gray levels are used to look up said gain conversion table to directly obtain said contrast expansion gain k.

3. The method of claim 2, further comprising the step of:
    performing a dynamic contrast expansion according to the following formula:

Gray'=$k$×(Gray−min), wherein said minimum gray level is an average of the minimum gray levels of a plurality of previously inputted mages and the minimum gray level of a current image used as a minimum gray level for a dynamic contrast expansion formula to compute a new gray level value after said image contrast expansion is processed.

4. The method of claim 2, wherein said inputted image after going through the operation of said image contrast expansion uses a gamma conversion table that varies according to different contrast expansion gains to perform a gamma value adjustment to a low gray level of said outputted image.

5. The method of claim 3, wherein said inputted image after going through the operation of said image contrast expansion uses a gamma conversion table that varies according to different contrast expansion gains to perform a gamma value adjustment to a low gray level of said outputted image.

6. The method of claim 2, wherein said inputted image after going through the operation of said image contrast expansion and before being outputted to a video display bases on the gamma value of a brightness and a gray level corresponding to said video display for converting the relation of said brightness and gray level of said outputted image, such that the product of the gamma value of said outputted image and the gamma value of said video display is maintained substantially at 1.0.

7. The method of claim 3, wherein said inputted image after going through the operation of said image contrast expansion and before being outputted to a video display bases on the gamma value of a brightness and a gray level corresponding to said video display for converting the relation of said brightness and gray level of said outputted image, such that the product of the gamma value of said outputted image and the gamma value of said video display is maintained substantially at 1.0.

8. A method of dynamic image contrast expansion used for processing an inputted image, comprising the steps of:
    using an inputted image gamma conversion unit for performing a gamma conversion for an inputted image to convert the relation of the brightness and gray level of said inputted image into a linear relation;
    using an image dynamic contrast expansion unit for analyzing an image property histogram of said inputted image to compute a maximum gray level and a minimum gray level required for computing an image contrast expansion, and said maximum gray level and said minimum gray level are used in the following formula:

$$k = \frac{255}{max - min}$$

to obtain an image contrast expansion gain k;
    and using the following formula for computing a dynamic contrast expansion:

Gray'=$k$×(Gray−min), wherein said minimum gray level is an average of the minimum gray levels of a plurality of previously inputted images and the minimum gray level of a current image used as the minimum gray level in a dynamic contrast expansion formula, so as to compute a new gray level value outputted after said image contrast expansion is performed.

9. The method of claim 8, wherein said different maximum gray levels and minimum gray levels are used according to a formula to compute a corresponding image contrast expansion gain k in advance and produce a gain conversion table, such that when said contrast expansion gain is computed, said maximum gray level and said minimum gray level are used to look up said gain conversion table to directly obtain said contrast expansion gain k.

10. The method of claim 9, wherein said inputted image after going through the operation of said image contrast expansion uses a gamma conversion table that varies with said contrast expansion gain to perform a gamma value adjustment to a low gray level of said outputted image.

11. The method of claim 9, wherein said inputted image after going through the operation of said image contrast expansion and before being outputted to a video display, the gamma value corresponding to said brightness and gray level of said video display is used for converting the relation of said brightness and gray level of said outputted image, such that the product of the gamma value of said outputted image and the gamma value of said video display is maintained substantially at 1.0.

12. The method of claim 10, wherein said inputted image after going through the operation of said image contrast expansion and before being outputted to a video display, the gamma value corresponding to said brightness and gray level of said video display is used for converting the relation of said brightness and gray level of said outputted image, such that the product of the gamma value of said outputted image and the gamma value of said video display is maintained substantially at 1.0.

13. An apparatus for dynamic image contrast expansion used for processing an inputted image, comprising:
  an inputted image gamma conversion unit, for performing a gamma conversion to said inputted image, so that a linear relation exists between the gray level and brightness of said image; and
  an image dynamic contrast expansion unit, for analyzing an image property histogram to compute a maximum gray level and a minimum gray level required for computing said image contrast expansion, and then using the following formula to determine an image contrast expansion gain k:

$$k = \frac{255}{\max - \min},$$

wherein said image dynamic contrast expansion unit comprises an image contrast expansion gain average processing unit, such that if said average processing unit performs a dynamic contrast expansion according to the following formula:

Gray'=$k$×(Gray−min), wherein said contrast expansion gain is given by the following formula:

$$k_{out} = \frac{1}{N}\sum_{i=1}^{N} k_i$$

to obtain an average $k_{out}$ of a plurality of previous image contrast expansion gains $k_1$~$k_{N-1}$ and a current image contrast expansion gain $k_N$ used as a gain in a dynamic contrast expansion formula to compute a new gray level value Gray' of an outputted image after said image contrast expansion is performed for the gray level value Gray of said inputted image.

14. The apparatus of claim 13, wherein said image dynamic contrast expansion unit further comprises:
  an input image signal smooth processing unit, for performing a smooth process to a video signal used for compiling statistics of said image property histogram.

15. The apparatus of claim 14, wherein said image dynamic contrast expansion unit further comprises:
  an image property histogram statistic compiling unit, for performing a statistic of a pixel number of each gray level value for all pixels of said inputted image after said smooth process is performed.

16. The apparatus of claim 15, wherein said image dynamic contrast expansion unit further comprises:
  a maximum and minimum gray level determination processing unit for finding an area by integrating the utmost right side of said image property histogram towards the left side, and if the integrated area reaches a defined critical value, the corresponding gray level value is defined as a maximum gray level, and finding an area by integrating the utmost left side of said image property histogram towards the right side, and if the integrated area reaches a defined critical value, the corresponding gray level value is defined as a minimum gray level.

17. The apparatus of claim 16, wherein said image dynamic contrast expansion unit further comprises:
  a gain conversion table for computing a corresponding image contrast expansion coefficient k according various different maximum gray levels and minimum gray levels and a formula and producing said gain conversion table, so that when said maximum gray level and said minimum gray level required for performing a contrast expansion for said inputted image are found, said gain conversion table is looked up directly to obtain a corresponding image contrast expansion coefficient k.

18. The apparatus of claim 17, wherein said image dynamic contrast expansion unit further comprises:
  a minimum gray level average processing unit, for performing a dynamic contrast expansion according to the following formula:

Gray'=$k$×(Gray−min), wherein said minimum gray level is obtained by the following formula:

$$min_{out} = \frac{1}{N}\sum_{i=1}^{N} min_i$$

to obtain an average $min_{out}$ of the minimum gray levels $min_1$~$min_{N-1}$ of a plurality of previous inputted images and the minimum gray level $min_N$ of a current image as a minimum gray level for a dynamic contrast expansion formula to compute a new outputted gray level value after said image contrast expansion is performed.

19. The apparatus of claim 17, wherein said image dynamic contrast expansion unit further comprises:
  a dynamic contrast expansion processing unit, for computing a gray level value of said outputted image after said image contrast expansion is performed according to said obtained contrast expansion gain $K_{out}$, said minimum gray level $Min_{out}$, and said gray level value Gray of said video signal, and said dynamic contrast expansion formula.

20. The apparatus of claim 18, wherein said image dynamic contrast expansion unit further comprises:
  a dynamic contrast expansion processing unit, for computing a gray level value of said outputted image after said image contrast expansion is performed according to said obtained contrast expansion gain $K_{out}$, said minimum gray level $Min_{out}$, and said gray level value Gray of said video signal, and said dynamic contrast expansion formula.

21. The apparatus of claim 19, further comprising a noise reducing unit for an image at a low gray level, and said noise reducing unit comprises a dynamic gamma conversion table of an image contrast expansion and a dynamic gamma conversion unit, and the gamma value in said conversion table varies according to different contrast expansion gains, and said dynamic gamma conversion unit performs a gamma value adjustment to a mid to low gray level of said image according to said conversion table.

22. The apparatus of claim 20, further comprising a noise reducing unit for an image at a low gray level, and said noise reducing unit comprises a dynamic gamma conversion table of an image contrast expansion and a dynamic gamma conversion unit, and the gamma value in said conversion table varies according to different contrast expansion gains, and said dynamic gamma conversion unit performs a gamma value adjustment to a mid to low gray level of said image according to said conversion table.

23. The apparatus of claim 19, further comprising a gamma conversion unit of an outputted image such that after said gamma conversion unit performs an image contrast expansion to said inputted image and before said inputted image is inputted to a video display, said gamma conversion unit converts the relation of a brightness and a gray level of said outputted image according to the gamma values corresponding to the brightness and gray level of said video display, and the product of the gamma value of said outputted image and the gamma value of said video display is maintained substantially at 1.0.

24. The apparatus of claim 20, further comprising a gamma conversion unit of an outputted image such that after said gamma conversion unit performs an image contrast expansion to said inputted image and before said inputted image is inputted to a video display, said gamma conversion unit converts the relation of a brightness and a gray level of said outputted image according to the gamma values corresponding to the brightness and gray level of said video display, and the product of the gamma value of said outputted image and the gamma value of said video display is maintained substantially at 1.0.

25. An apparatus for dynamic image contrast expansion, used for processing an inputted image, comprising:

a gamma conversion unit of an inputted image, for performing a gamma conversion to said inputted image, such that a linear relation exists between the gray level and brightness of said image; and an image dynamic contrast expansion unit, for analyzing an image property histogram to compute a maximum gray level and a minimum gray level required for computing an image contrast expansion and uses the following formula to determine an image contrast expansion gain k:

$$k = \frac{255}{max - min},$$

wherein said image dynamic contrast expansion unit comprises an image contrast expansion gain average processing unit, and said average processing unit performs a dynamic contrast expansion according to the following formula:

Gray'=k×(Gray−min), wherein said minimum gray level (min) is computed by the following formula:

$$min_{out} = \frac{1}{N}\sum_{i=1}^{N} min_i$$

to obtain an average $min_{out}$ of the minimum gray levels $min_1$~$min_{N-1}$ of a plurality of previous inputted images and the minimum gray level $min_N$ of a current image as a minimum gray level for a dynamic contrast expansion formula and compute a new outputted gray level value after said image contrast expansion is performed.

26. The apparatus of claim 25, wherein said image dynamic contrast expansion unit further comprises:

an inputted video signal smooth processing unit, for performing a smooth process to a video signal used for compiling a statistic for said image property histogram.

27. The apparatus of claim 26, wherein said image dynamic contrast expansion unit further comprises:

an image property histogram statistic compiling unit, for carrying out a statistic of pixels for each gray level value of all pixels on an imputed image after said smooth process is performed.

28. The apparatus of claim 27, wherein said image dynamic contrast expansion unit further comprises:

a maximum and minimum gray level determination processing unit for performing an integration from the utmost right side of said image property histogram towards the left side to obtain an area, and if said area reaches a defined critical value, the corresponding gray level value is defined as a maximum gray level or performing an integration from the utmost left side of said image property histogram towards the right side to obtain an area, and if said area reaches a defined critical value, the corresponding gray level value is defined as a minimum gray level.

29. The apparatus of claim 28, wherein said image dynamic contrast expansion unit further comprises:

a gain conversion table, for computing the corresponding image contrast expansion coefficient k according to said different maximum gray levels and minimum gray levels and the formula, and said image contrast expansion coefficient k is used to produce said gain conversion table, so that if said maximum gray level and said minimum gray level required for performing a contrast expansion for said image are computed, said gain conversion table will be looked up directly to obtain said corresponding image contrast expansion coefficient k.

30. The apparatus of claim 29, wherein said image dynamic contrast expansion unit further comprises:

a dynamic contrast expansion processing unit, for computing an image gray level value Gray' after said image dynamic contrast expansion is processed according to said obtained contrast expansion gain $K_{out}$, minimum gray level $Min_{out}$ and gray level value Gray of said video signal and said dynamic contrast expansion formula.

31. The apparatus of claim 30, further comprising a noise reducing unit for an image at a low gray level, and said noise reducing unit comprises a dynamic gamma conversion table of an image contrast expansion and a dynamic gamma conversion unit, and the gamma in said conversion table varies according to different contrast expansion gains, and said gamma conversion unit performs a gamma adjustment to the images at a mid and low gray level according to said conversion table.

32. The apparatus of claim 31, further comprising a gamma conversion unit of an outputted image, such that after said gamma conversion unit performs an image contrast expansion to said inputted image and before said inputted image is inputted to a video display, the relation of brightness and gray level of said outputted image is converted according to the gamma values of corresponding brightness and gray level of said video display, and the product of the gamma value of said outputted image and the gamma value of said video display is maintained substantially at 1.0.

* * * * *

UNITED STATES PATENT AND TRADEMARK OFFICE
CERTIFICATE OF CORRECTION

PATENT NO. : 7,609,886 B2  Page 1 of 1
APPLICATION NO. : 11/410041
DATED : October 27, 2009
INVENTOR(S) : Kao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 777 days.

Signed and Sealed this

Twelfth Day of October, 2010

David J. Kappos
*Director of the United States Patent and Trademark Office*